(12) United States Patent
Itoh (10) Patent No.: US 8,511,949 B2
(45) Date of Patent: Aug. 20, 2013

(54) METHOD OF CUTTING TREE-SHAPED GROOVE AND ROTARY CUTTING TOOL

(75) Inventor: Tasuku Itoh, Toyokawa (JP)

(73) Assignee: OSG Corporation, Toyokawa (JP)

( * ) Notice: Subject to any disclaimer, the term of this patent is extended or adjusted under 35 U.S.C. 154(b) by 303 days.

(21) Appl. No.: 13/054,875

(22) PCT Filed: Jul. 30, 2008

(86) PCT No.: PCT/JP2008/063651
§ 371 (c)(1),
(2), (4) Date: Jan. 19, 2011

(87) PCT Pub. No.: WO2010/013319
PCT Pub. Date: Feb. 4, 2010

(65) Prior Publication Data
US 2011/0129311 A1 Jun. 2, 2011

(51) Int. Cl.
*B23C 5/10* (2006.01)
(52) U.S. Cl.
CPC ........................................ *B23C 5/10* (2013.01)
USPC ................ 409/132; 407/53; 407/61; 407/115
(58) Field of Classification Search
USPC .................. 409/132; 29/889; 407/53, 54, 57, 407/61, 62, 63, 115, 116
See application file for complete search history.

(56) References Cited

U.S. PATENT DOCUMENTS

| | | | |
|---|---|---|---|
| 5,911,548 A | 6/1999 | Deiss et al. | |
| 5,931,616 A * | 8/1999 | Daub | 409/132 |
| 5,975,882 A | 11/1999 | Nomura et al. | |

(Continued)

FOREIGN PATENT DOCUMENTS

| | | |
|---|---|---|
| CN | 1496770 A | 5/2004 |
| CN | 2801351 Y | 8/2006 |

(Continued)

OTHER PUBLICATIONS

Information about New Product of Shin-Ei, Seisakusho Co., Ltd. Published in Advertisement Page (Document Request No. 405) of "Mechanical Engineering," Mar. 2001 (vol. 49, No. 3), Nikkan Kogyo Shimbun Ltd.

(Continued)

*Primary Examiner* — Daniel Howell
*Assistant Examiner* — Alan Snyder
(74) *Attorney, Agent, or Firm* — Oliff & Berridge, PLC (57) ABSTRACT

In cutting processes of a tree-shaped groove, in a rough cutting process, by using a rough cutting tool (20), as well as cutting a tapered groove (2), cutting is performed in a first narrow portion (11), a second narrow portion (12), and a third narrow portion (13) of a planned groove shape 10 such that a specified cutting allowance is left. In the following semi-finishing process, by using a semi-finishing tool, cutting is performed for portions other than the three narrow portions (11 to 13) that have already been cut. Because a work material 1 does not come in contact with three reduced diameter portions, of the semi-finishing tool formed in an upside-down Christmas tree shape, corresponding to the three narrow portions (11 to 13), a load is not imposed on the three reduced diameter portions, which are weak against shock among all portions of the semi-finishing tool, and the cutting feed can therefore be faster. Further, by performing a finishing process, the tree-shaped groove can be efficiently cut.

3 Claims, 12 Drawing Sheets

(56) References Cited

U.S. PATENT DOCUMENTS

| | | | |
|---|---|---|---|
| 6,164,877 A | 12/2000 | Kamata et al. | |
| 6,322,296 B1 * | 11/2001 | Wetli et al. | 407/42 |
| 6,893,195 B2 | 5/2005 | Wetli | |
| 2003/0138301 A1 * | 7/2003 | Kuerzel | 407/34 |

FOREIGN PATENT DOCUMENTS

| | | |
|---|---|---|
| DE | 199 11 927 A1 | 10/1999 |
| JP | U-62-74917 | 5/1987 |
| JP | A-06-270006 | 9/1994 |
| JP | A-09-234617 | 9/1997 |
| JP | A-10-076415 | 3/1998 |
| JP | A-11-245112 | 9/1999 |
| JP | A-11-267916 | 10/1999 |
| JP | B2-3058856 | 7/2000 |
| JP | A-2000-326133 | 11/2000 |
| JP | A-2001-071210 | 3/2001 |
| JP | A-2001-310211 | 11/2001 |
| JP | A-2005-144590 | 6/2005 |
| JP | A-2005-169513 | 6/2005 |
| JP | A-2007-021610 | 2/2007 |
| JP | A-2008-307621 | 12/2008 |

OTHER PUBLICATIONS

Mar. 29, 2012 Third Party Submission issued in JP Application No. 2010-522552 (with English translation).

Apr. 23, 2012 Notification issued in JP Application No. 2010-522552 (with English translation).

Jun. 20, 2012 Office Action issued in Chinese Patent Application No. 200880130402.6 (with translation).

Jul. 10, 2012 Office Action issued in Japanese Patent Application No. 2010-522552 (with translation).

Sep. 7, 2012 Office Action issued in German Application No. 112008003952.6 (with English translation).

Oct. 28, 2008 English-language translation of International Preliminary Report on Patentability issued in International Application No. PCT/JP2008/063651.

Oct. 28, 2008 Written Opinion issued in International Application No. PCT/JP2008/063651 (with translation).

International Search Report for International Application No. PCT/JP2008/063651, dated Oct. 28, 2008 (with English-language translation).

Jul. 4, 2012 Office Action issued in Korean Application No. 10-2011-7002243 (with English translation).

* cited by examiner

FINISHING PROCESS

METHOD OF CUTTING TREE-SHAPED GROOVE AND ROTARY CUTTING TOOL

TECHNICAL FIELD

The present invention relates to a method of cutting a tree-shaped groove and a rotary cutting tool, and specifically relates to a method of cutting a tree-shaped groove for mounting a turbine blade on an outer circumference of a rotor, and a rotary cutting tool that is used for the cutting method.

BACKGROUND ART

Conventionally, in a case where a turbine rotor for a generator is manufactured, it is necessary to form a groove, into which a base portion of a turbine blade is to be inserted, in a shaft of the rotor. Normally, the groove has a fir-tree-shaped contour or a Christmas-tree-shaped contour and is provided in a plurality by undercutting. This sort of tree-shaped groove is generally bilaterally symmetrical with respect to a center of the groove, is machined such that the groove gradually becomes narrower in a groove depth direction, in an upside-down Christmas tree shape in which the groove width increases and decreases, and narrow portions where the groove width becomes less alternate with wide portions where the groove width becomes greater. In order to machine this sort of tree-shaped groove in a single pass, a Christmas cutter, for example, may be used (refer to Patent Document 1, for example). However, because a complex groove is formed in a single pass, a heavy load is imposed on the Christmas cutter and sufficient durability is required. Therefore, a method is known in which the tree-shaped groove is formed not in a single pass, but through a plurality of processes.

Figure 12:
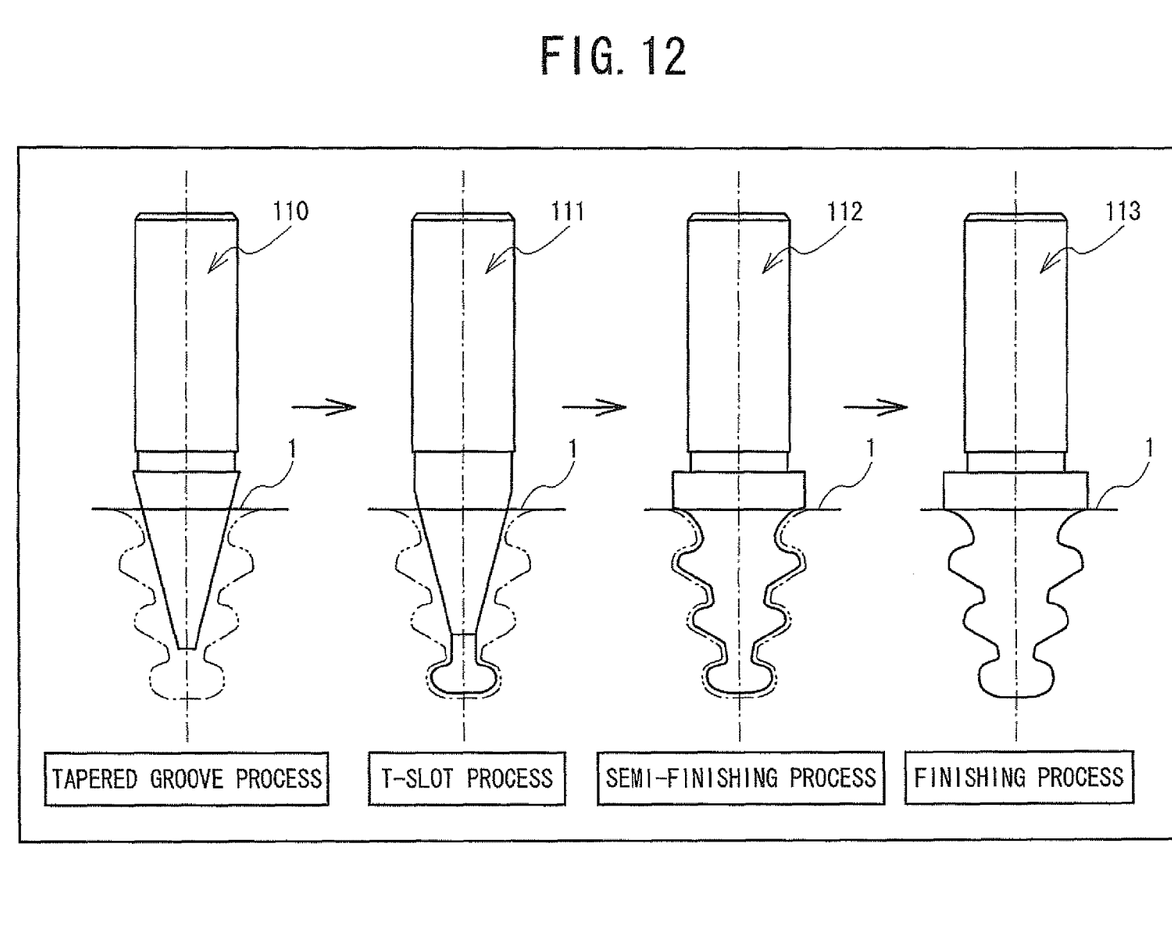
FIG. 12 is a flow of known tree-shaped groove cutting processes.

For example, known tree-shaped groove forming processes shown in FIG. 12 include four processes of a "tapered groove process", a "T-slot process", a "semi-finishing process" and a "finishing process". First, in the tapered groove process, a tapered groove is cut in a work material 1 by a taper tool 110. Next, in the T-slot process, a T-slot portion is cut in the bottom of the tapered groove by a T-slot tool 111. Then, the tree-shaped groove is cut by a semi-finishing tool 112 such that a specified cutting allowance is left in relation to a final planned groove shape. Finally, the cutting allowance which has been left is cut by a finishing tool 113 at one time, and machining is performed along the finished shape. In this manner, the tree-shaped groove is formed in the work material 1.
Patent Document 1: Japanese Laid-Open Patent Publication No. 2001-71210

In the known tree-shaped groove cutting processes shown in FIG. 12, in the semi-finishing process, narrow portions in the finished shape are respectively formed by reduced diameter portions of the semi-finishing tool 112 that are narrower toward a radially inward direction, however, because the reduced diameter portions have a reduced diameter, a load may be imposed on the reduced diameter portions during cutting, and the reduced diameter portions may break. In order to prevent a load from being imposed on the reduced diameter portions, there has been a problem that the cutting feed cannot made faster, therefore, the tree-shaped groove cannot be rapidly cut. Further, there has been also a problem that the four processes must be performed to form one tree-shaped groove, which may be time-consuming and inefficient.

DISCLOSURE OF THE INVENTION

The present disclosure is made to solve the above-described problems, and it is an object thereof to provide a method of cutting a tree-shaped groove and a rotary cutting tool that are capable of efficiently cutting a tree-shaped groove.

The present disclosure provides a method of cutting a tree-shaped groove that is a groove for mounting a turbine blade on an outer circumference of a rotor, the tree-shaped groove being to be machined such that the tree-shaped groove is bilaterally symmetrical with respect to a center of the groove and the tree-shaped groove gradually becomes narrower in a groove depth direction in an upside-down Christmas tree shape in which a groove width increases and decreases, and the tree-shaped groove alternately including a narrow portion where the groove width becomes narrower and a wide portion where the groove width becomes wider, the method being characterized by comprising, in a case where a planned shape of the tree-shaped groove to be formed is viewed in a cross section along the groove depth direction, a rough cutting step of cutting a tapered shape in which the groove width becomes narrower toward the groove depth direction while a specified cutting allowance is left for a portion that will become the narrow portion, a semi-finishing step of performing cutting such that a specified cutting allowance is left for a portion that will become the wide portion while avoiding the portion that will become the narrow portion for which the cutting allowance has been left, and a finishing step of cutting the cutting allowance that has been left for the portion that will become the narrow portion and the cutting allowance that has been left for the portion that will become the wide portion.

BEST MODE FOR CARRYING OUT THE INVENTION

Figure 1:
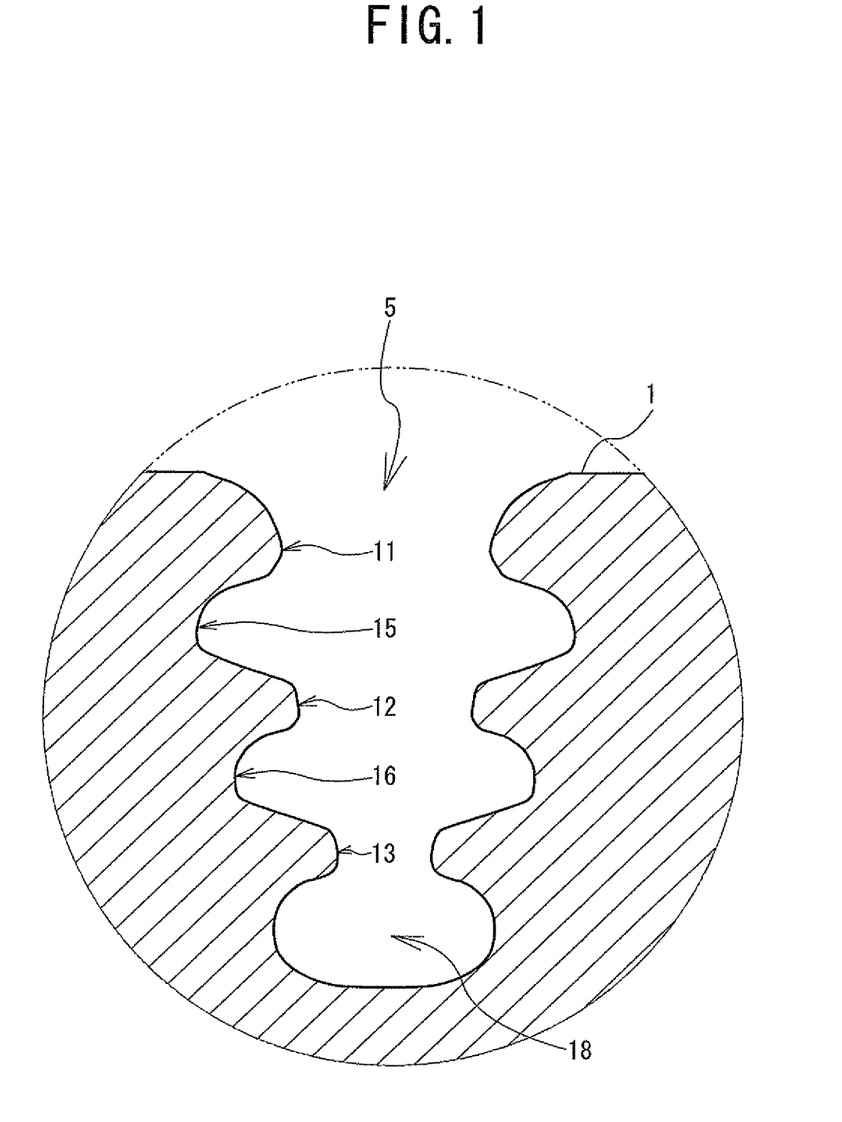
FIG. 1 is a cross-sectional view of a tree-shaped groove 5.

Hereinafter, a method of cutting a tree-shaped groove 5 and various types of rotary cutting tools (20, 30) used for the cutting method, which are embodiments of the present disclosure, will be explained in order with reference to the drawings. The tree-shaped groove 5 that is shown in FIG. 1 is a groove used for mounting a turbine blade on an outer circumference of a rotor that is used as a generator.

First, the shape of the tree-shaped groove 5 will be explained. As shown in FIG. 1, the tree-shaped groove 5 that is formed in a work material 1 is bilaterally symmetrical with respect to a center of the groove, and is formed such that a groove width gradually becomes narrower in a groove depth direction in an upside-down Christmas tree shape in which the groove width increases and decreases. On an inner peripheral surface of the tree-shaped groove 5, a first narrow portion 11, a second narrow portion 12, and a third narrow portion 13 are formed with intervals between the narrow portions in the groove depth direction such that groove widths of the narrow portions gradually decrease. In addition, a first wide portion 15 is formed between the first narrow portion 11 and the second narrow portion 12, and a second wide portion 16 is formed between the second narrow portion 12 and the third narrow portion 13. The groove width of the second wide portion 16 is narrower than the groove width of the first wide portion 15. Further, a T-slot portion 18, which protrudes in a flange shape in a direction orthogonal to the groove depth direction and is formed in an inverted T-shape, is formed in a groove bottom of the tree-shaped groove 5.

Figure 2:
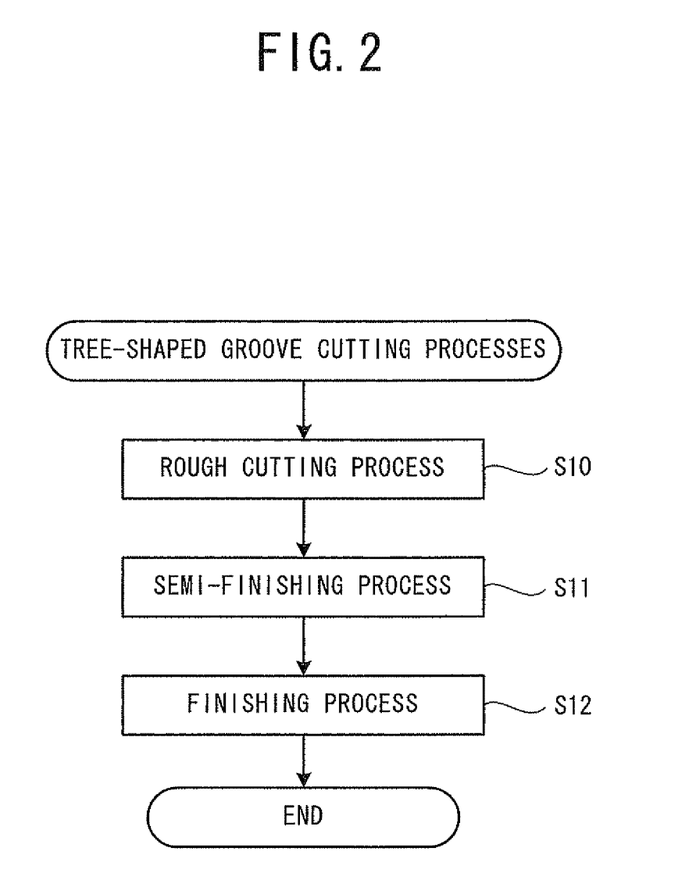
FIG. 2 is a flowchart of tree-shaped groove cutting processes.

Next, cutting processes of the tree-shaped groove 5 having the above-described shape will be explained. As shown in FIG. 2, the tree-shaped groove cutting processes include a rough cutting process (S10), a semi-finishing process (S11), and a finishing process (S12). Hereinafter, the contents of these three processes will be explained in order in detail.

Figure 3:
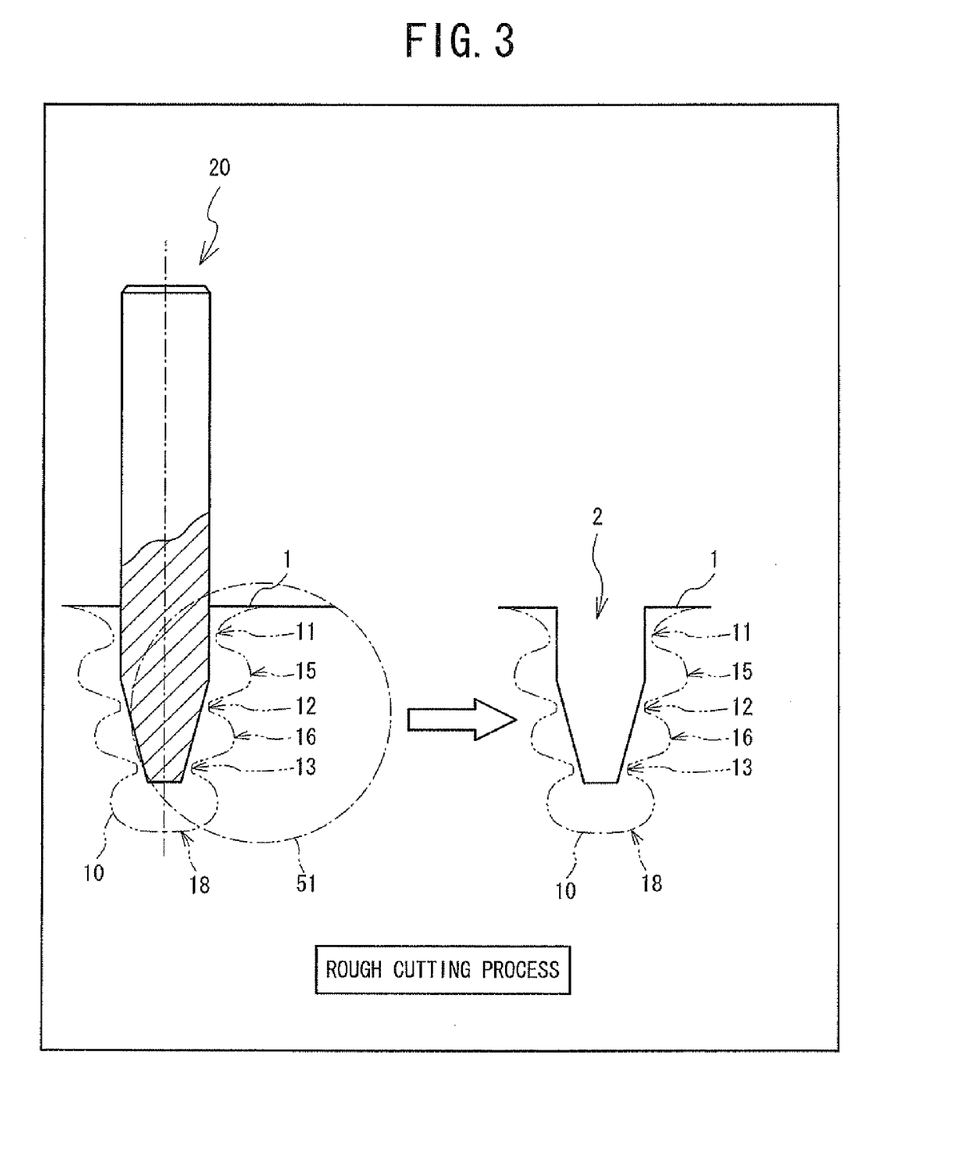
FIG. 3 is an explanatory diagram that shows the content of a rough cutting process.

First, the rough cutting process (S10) will be explained. As shown in FIG. 3, in a case where it is assumed that a planned groove shape 10 (indicated by a dash-and-two-dot line) will be finally formed in the work material 1, a tapered groove 2 is first cut by a rough cutting tool 20. The tapered groove 2 is cut into a tapered shape such that the tapered groove 2 gradually decreases toward its tip end side in the groove depth direction of the planned groove shape 10, and a back end side is cut in a straight manner. Cutting is performed in the first narrow portion 11, the second narrow portion 12, and the third narrow portion 13 of the planned groove shape 10 such that a specified cutting allowance 50 (refer to FIG. 5) is left.

Here, compared with known processes shown in FIG. 12, in a known tapered groove process, only a tapered groove is formed in the work material 1 and cutting is not performed for the narrow portions of the planned groove shape, and in a following semi-finishing process, cutting is performed for the narrow portions and the wide portions. On the other hand, the rough cutting process of the present embodiment has a feature in that portions that will become the first narrow portion 11, the second narrow portion 12, and the third narrow portion 13 are cut in advance by cutting the tapered groove 2.

Figure 4:
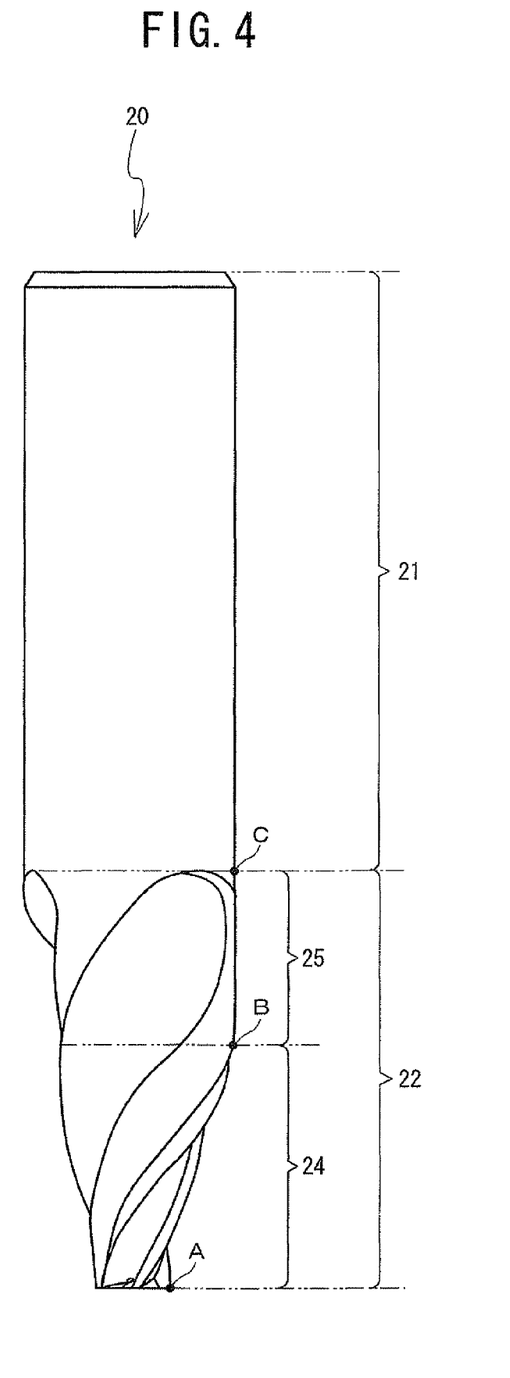
FIG. 4 is a side view of a rough cutting tool 20.

Next, the configuration of the rough cutting tool 20 will be described. As shown in FIG. 4, the rough cutting tool 20 is configured from a column-shaped shank portion 21 and a cutting edge portion 22 that is provided on a tip end portion in an axial direction of the shank portion 21 and that is formed in a substantially cone shape in which the diameter becomes smaller toward the tip end side in a tapered manner. The cutting edge portion 22 is configured from a tapered portion 24 that is formed on a tip end side in the axial direction and a straight portion 25 that is formed on a rear end side in the axial direction.

Figure 5:
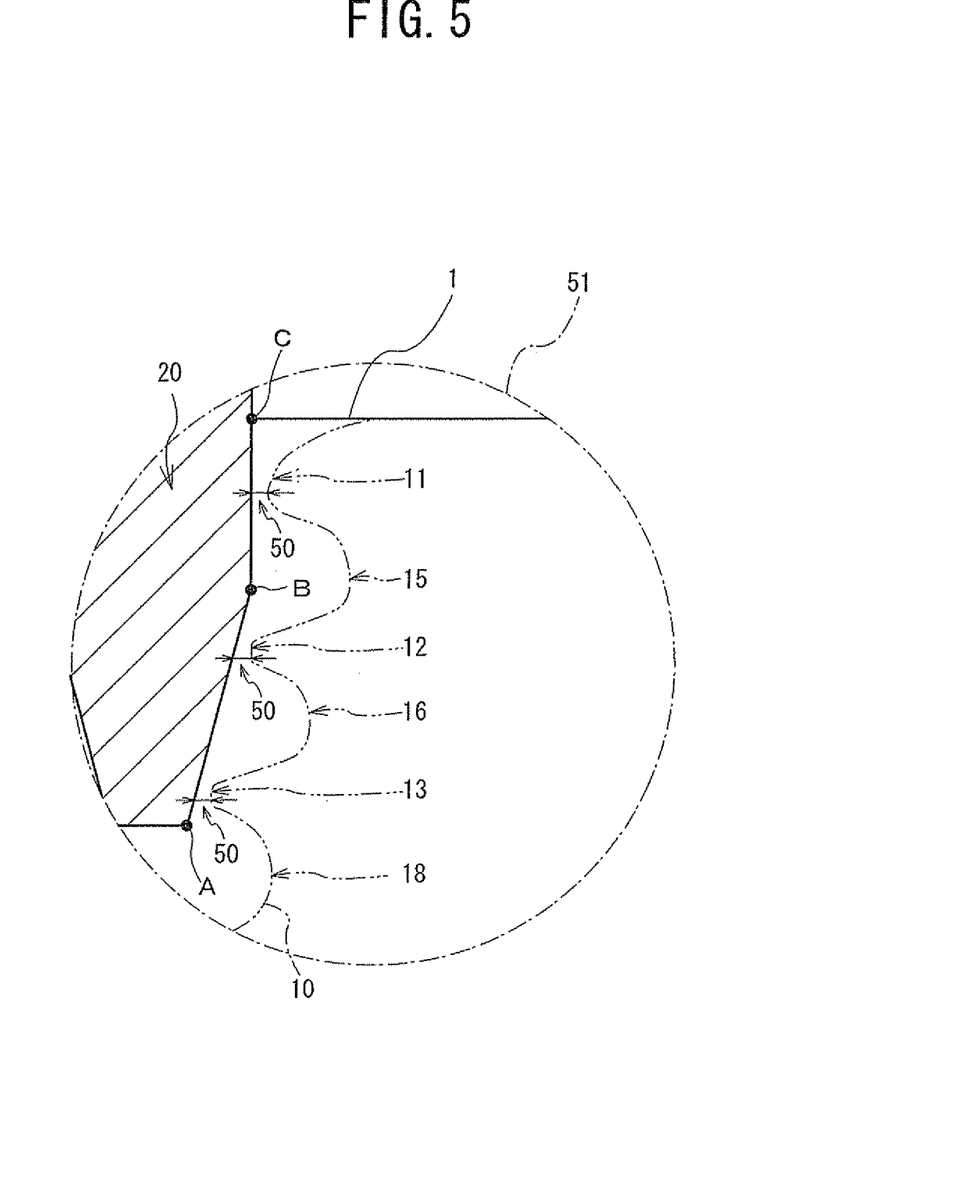
FIG. 5 is an enlarged view of a section enclosed by a dash-and-dot line 51 shown in FIG. 3.

Next, a relation between the portions of the rough cutting tool 20 and the cut shape of the tapered groove 2 will be explained. As described above, in the rough cutting process shown in FIG. 3, cutting is performed in the first narrow portion 11, the second narrow portion 12, and the third narrow portion 13 of the planned groove shape 10 such that the specified cutting allowance 50 is left. Specifically, as shown in FIG. 5, as well as forming the tapered groove 2, cutting is performed such that the specified cutting allowance 50 is left at three points of the first narrow portion 11, the second narrow portion 12, and the third narrow portion 13. In this case, if the three points are connected by a single taper, it is possible to perform cutting using a known normal taper tool (a taper end mill) 110 (refer to FIG. 12). However, in actuality, because the groove width of the third narrow portion 13 becomes wider than necessary, it is not possible to perform cutting at one time such that the specified cutting allowance 50 is left at the above-described three points.

In the rough cutting tool 20 of the present embodiment, the cutting edge portion 22 is formed by the taper portion 24 and the straight portion 25 as shown in FIG. 4. For example, even if the above-described three points cannot be connected by a single taper, two points of the three points can be connected by a single taper. Specifically, in a case where the first narrow portion 11 of the planned groove shape 10 is cut by the straight portion 25 such that the specified cutting allowance 50 is left, the second narrow portion 12 and the third narrow portion 13 can be cut by the tapered portion 24 such that the specified cutting allowance 50 is left.

For example, when the rough cutting tool 20 is viewed from the side, it is assumed that an outer circumferential portion of the tip end is a point A, an outer circumferential portion of a boundary between the tapered portion 24 and the straight portion 25 is a point B, and an outer circumferential portion of a boundary between the shank portion 21 and the cutting edge portion 22 is a point C. In this case, as shown in FIG. 5, cutting is performed by a straight line portion that connects the point C and the point B such that the specified cutting allowance 50 is left for the first narrow portion 11. Accordingly, cutting can be performed by a tapered straight line portion that connects the point A and the point B such that the specified cutting allowance 50 is left for the second narrow portion 12 and the third narrow portion 13. Thus, in the rough cutting process, with the use of the rough cutting tool 20, the tapered groove 2 can be formed in a single pass while the specified cutting allowance 50 is left at the three points of the first narrow portion 11, the second narrow portion 12, and the third narrow portion 13.

Figure 6:
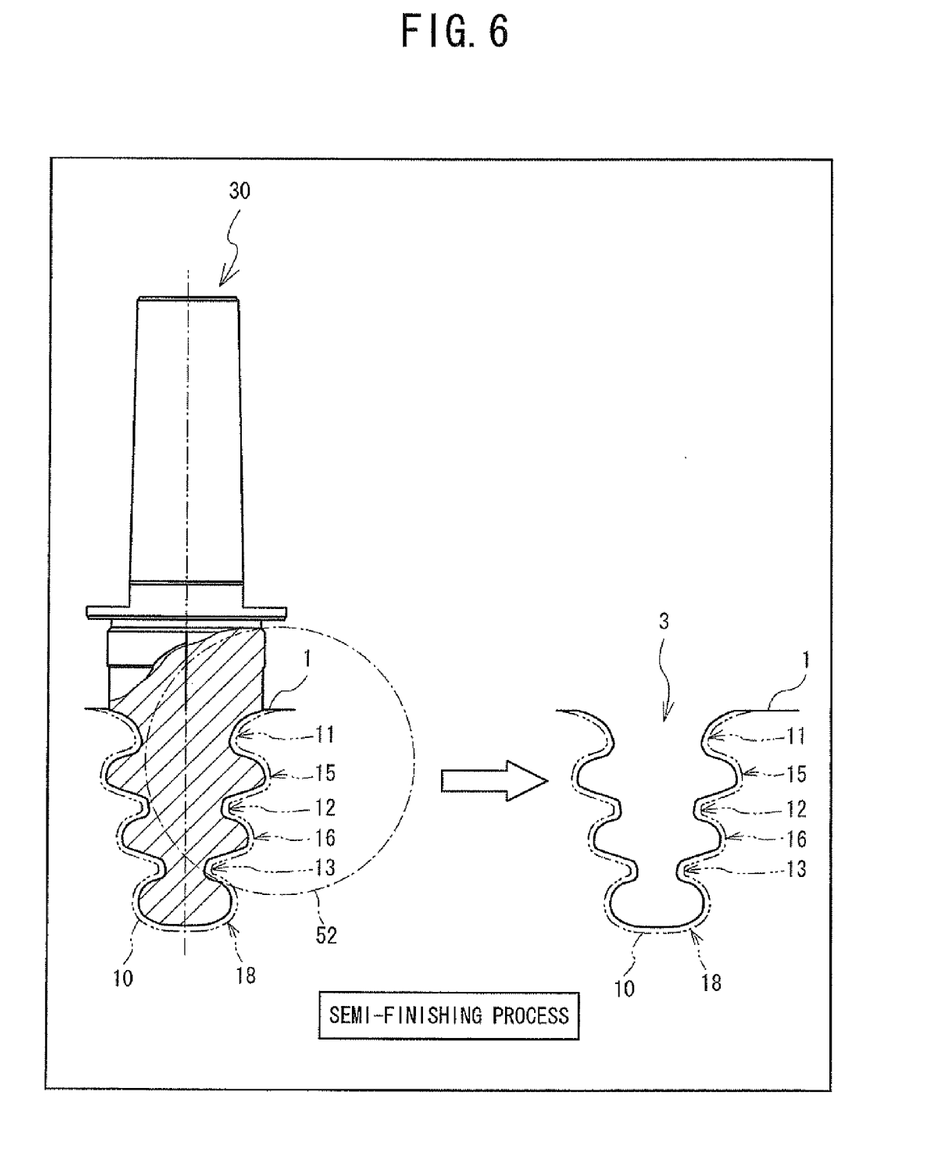
FIG. 6 is an explanatory diagram that shows the content of a semi-finishing process.

Next, the semi-finishing process (S11) will be explained. As shown in FIG. 6, in a case where it is assumed that the planned groove shape 10 (indicated by a two-dot-and-dash line) will be finally formed in the work material 1 in which the tapered groove 2 (refer to FIG. 3) has been formed in the rough cutting process (S10), a preliminary finished groove 3 is cut by a semi-finishing tool 30 (refer to FIG. 7) that has been formed in an upside-down Christmas tree shape. The preliminary finished groove 3 is a groove that has an upside-down Christmas tree shape in which the specified cutting allowance 50 is left for all portions of the planned groove shape 10.

Figure 7:
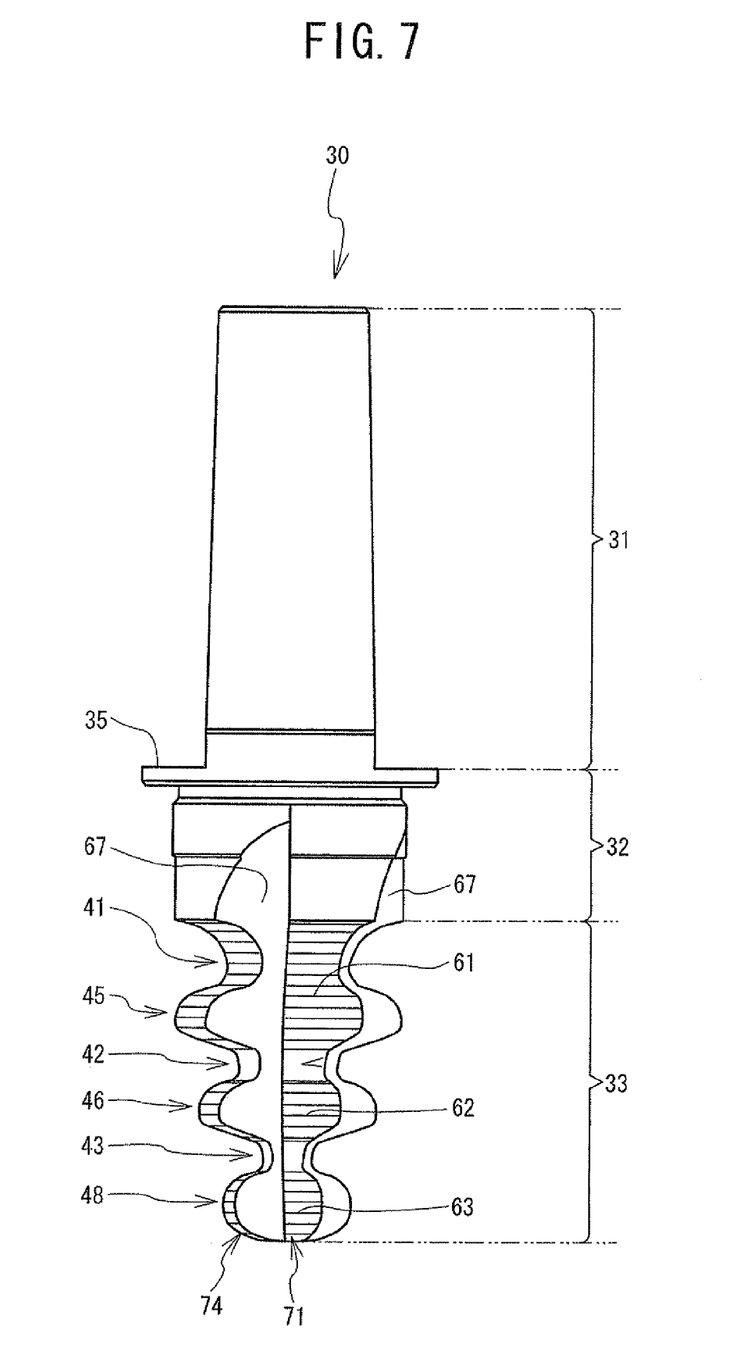
FIG. 7 is a side view of a semi-finishing tool 30.

Next, the configuration of the semi-finishing tool 30 will be explained. As shown in FIG. 7, the semi-finishing tool 30 is configured from a column-shaped shank portion 31, a column-shaped body portion 32 that is provided at a tip end portion in an axial direction of the shank portion 31 and that has a diameter larger than that of the shank portion 31, and a cutting edge portion 33 that is provided at a tip end portion in an axial direction of the body portion 32 and that has four cutting edges, which are formed such that the cutting edges gradually become narrower toward a tip end side in an upside-down Christmas tree shape in which the width increases and decreases. A flange portion 35, which is radially outwardly extended such that the flange portion 35 comes in contact and engages with an open end of an insertion hole of a tool holder (not shown in the drawings), is provided between the shank portion 31 and the body portion 32.

Figure 8:
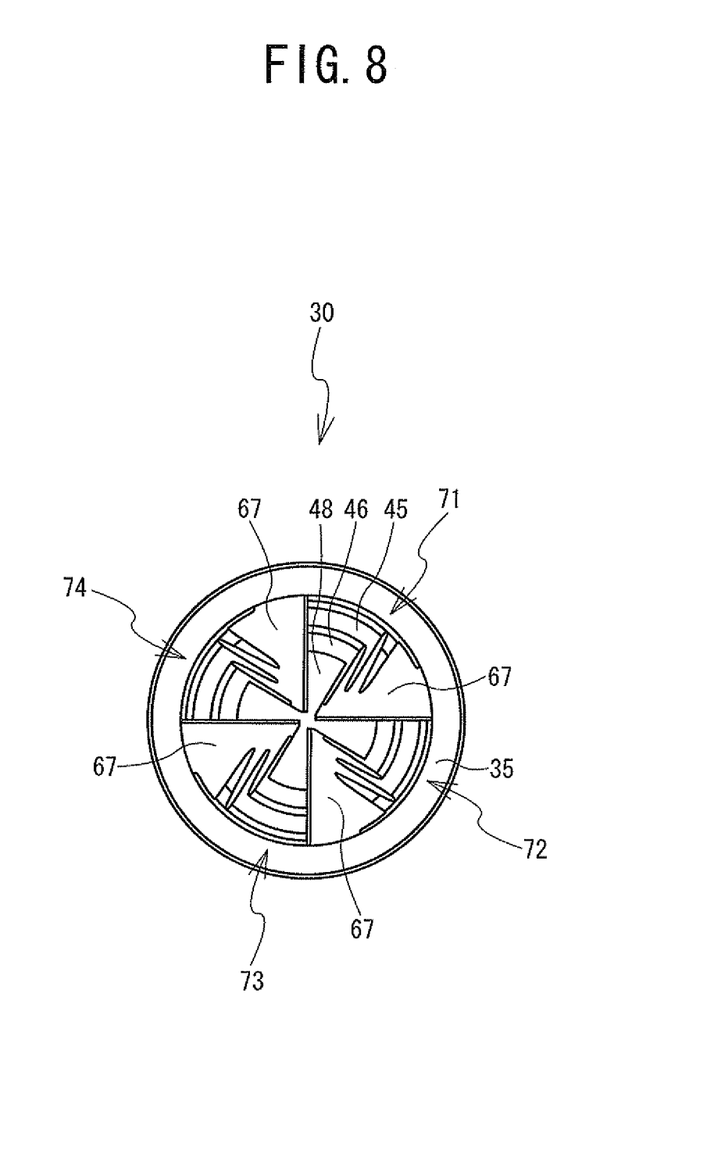
FIG. 8 is a view of the semi-finishing tool 30 when viewed from a tip end side in an axial direction.

As shown in FIG. 7 and FIG. 8, the cutting edge portion 33 includes four cutting edge units 71 to 74. The cutting edge units 71 to 74 are each formed such that the cutting edge units 71 to 74 gradually become smaller from a back end side toward a tip end side in an axial direction while their diameter increase and decrease. As shown in FIG. 7, on the cutting edge units 71 to 74, a first reduced diameter portion 41, a second reduced diameter portion 42, and a third reduced diameter portion 43 are formed with intervals between the reduced diameter portions, from the back end side toward the tip end side in the axial direction, such that their diameter gradually decrease. Further, a first expanded diameter portion 45 is provided between the first reduced diameter portion 41 and the second reduced diameter portion 42, a second expanded diameter portion 46 is provided between the second reduced diameter portion 42 and the third reduced diameter portion 43, and their diameter gradually become smaller.

Further, as shown in FIG. 7, a rounded-shaped protruding portion 48 that protrudes in a direction orthogonal to the axial direction is provided on the tip end of the cutting edge portion 33. Grooves 67 (refer to FIG. 7 and FIG. 8), which are formed in an L shape when the cutting edge portion 33 is viewed from the tip end side in the axial direction, are respectively provided between the cutting edge units 71 and 72, between the cutting edge units 72 and 73, between the cutting edge units 73 and 74, and between the cutting edge units 74 and 71 such that the grooves 67 are parallel to the axial direction.

Further, as shown in FIG. 7, a plurality of nicks 61, which are formed in a stepped manner in order to reduce contact friction with the work material 1 and to improve chip removal, are formed on the first reduced diameter portion 41, the first expanded diameter portion 45, the second expanded diameter portion 46, and the protruding portion 48 such that the plurality of nicks 61 are parallel to each other. The second reduced diameter portion 42 and the third reduced diameter portion 43 are prevented from contact with the work material 1 by reducing their diameter inwardly in the radial direction, therefore, the nicks 61 are not formed on them.

Next, a relationship between the portions of the semi-finishing tool 30 and the cut shape of the preliminary finished groove 3 will be explained. As shown in FIG. 6, in the semi-finishing process, as described above, cutting is performed in a single pass such that the specified cutting allowance 50 is left for all the portions of the planned groove shape 10. At this time, in the tapered groove 2 (refer to FIG. 3 and FIG. 5) that has been formed in the rough cutting process (S10), cutting has already been performed by the rough cutting tool 20 in the first narrow portion 11, the second narrow portion 12, and the third narrow portion 13 among all the portions of the planned groove shape 10 such that the specified cutting allowance 50 is left. In other words, in the semi-finishing process, there is no need to cut the first narrow portion 11, the second narrow portion 12, and the third narrow portion 13 that have already been cut. Therefore, only the first wide portion 15, the second wide portion 16, and the T-slot portion 18 may be cut such that the specified cutting allowance 50 is left.

Figure 9:
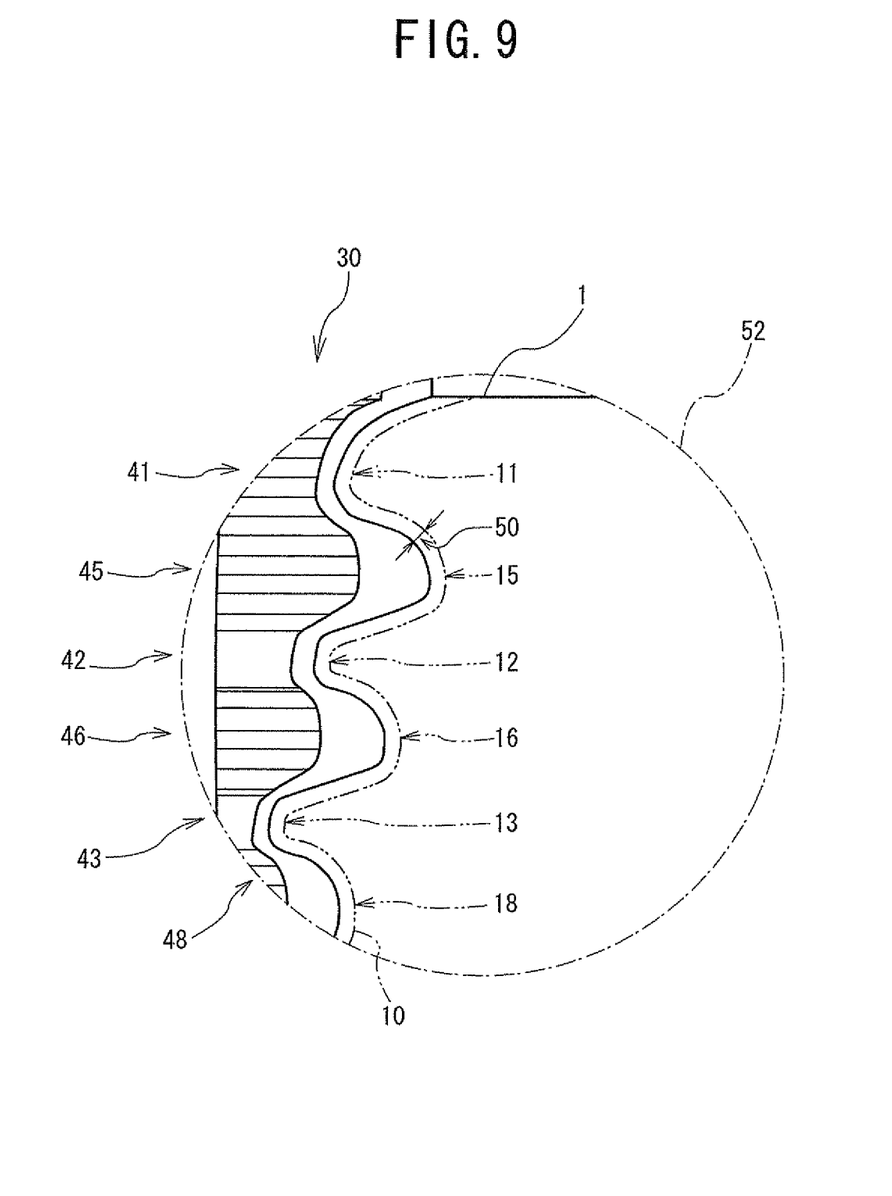
FIG. 9 is an enlarged view of a section enclosed by a dash-and-dot line 52 shown in FIG. 6.

In a case where cutting is performed by the semi-finishing tool 30, as shown in FIG. 9, the first reduced diameter portion 41 corresponds to the first narrow portion 11 of the planned groove shape 10, the second reduced diameter portion 42 corresponds to the second narrow portion 12 of the planned groove shape 10, and the third reduced diameter portion 43 corresponds to the third narrow portion 13 of the planned groove shape 10. Further, the first expanded diameter portion 45 corresponds to the first wide portion 15 of the planned groove shape 10, the second expanded diameter portion 46 corresponds to the second wide portion 16 of the planned groove shape 10, and the protruding portion 48 corresponds to the T-slot portion 18 of the planned groove shape 10.

Accordingly, the first wide portion 15 of the planned groove shape 10 is cut by the first expanded diameter portion 45 of the semi-finishing tool 30 such that the specified cutting allowance 50 is left, the second wide portion 16 of the planned groove shape 10 is cut by the second expanded diameter portion 46 such that the specified cutting allowance 50 is left, and the T-slot portion 18 of the planned groove shape 10 is cut by the protruding portion 48 such that the specified cutting allowance 50 is left. The first narrow portion 11, the second narrow portion 12, and the third narrow portion 13 of the planned groove shape 10 have already been cut such that the specified cutting allowance 50 is left.

Therefore, the first reduced diameter portion 41, the second reduced diameter portion 42, and the third reduced diameter portion 43 of the semi-finishing tool 30 do not come in contact with the work material 1. As a result, a load is not imposed on the first reduced diameter portion 41, the second reduced diameter portion 42, and the third reduced diameter portion 43, which are relatively weak against shock among all the portions of the semi-finishing tool 30. Accordingly, chatter noise and vibration that arise during machining may be suppressed, and there may be no concern that the semi-finishing tool 30 might break during cutting. Further, because cutting is performed by the first expanded diameter portion 45, the second expanded diameter portion 46, and the protruding portion 48 that are relatively strong against shock, the cutting feed by the semi-finishing tool 30 may be faster. Therefore, the work of the semi-finishing process may be performed efficiently.

Figure 10:
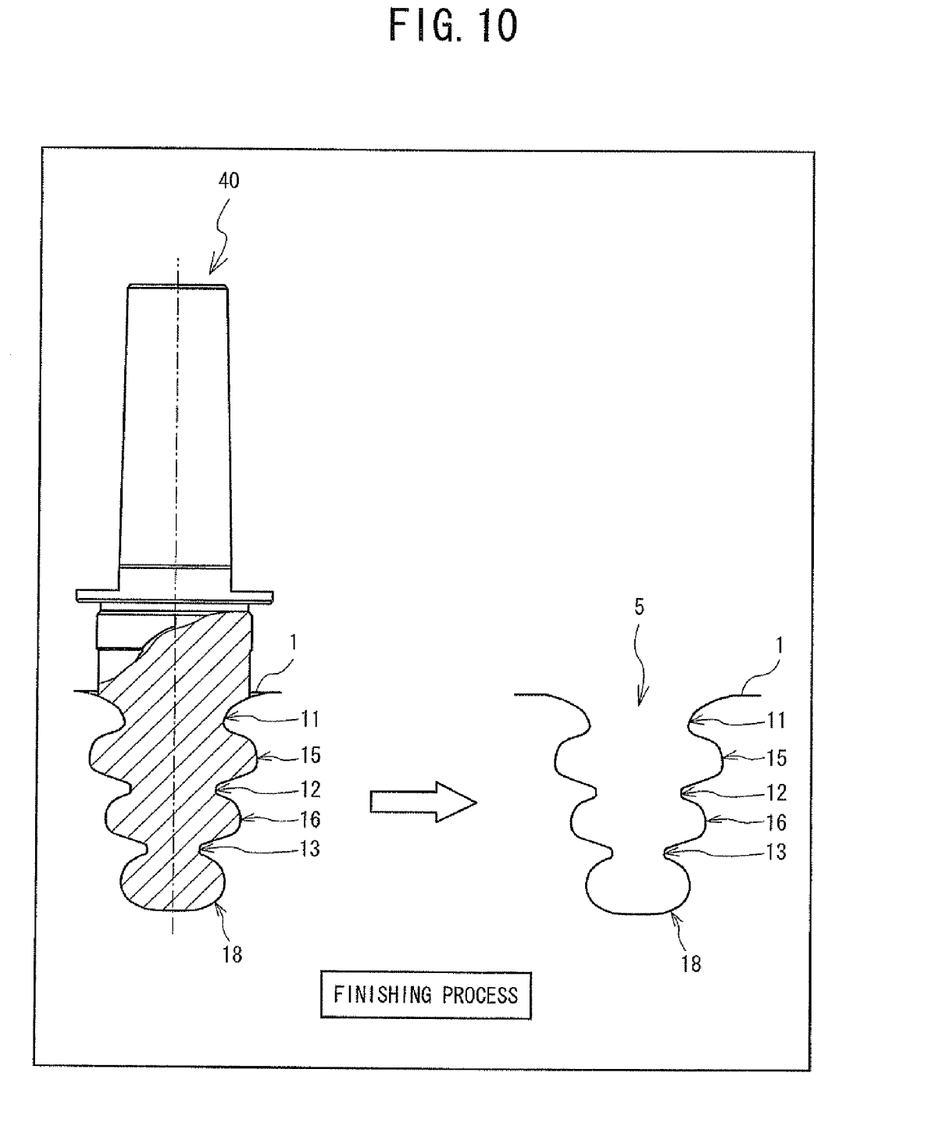
FIG. 10 is an explanatory diagram that shows the content of a finishing process.

Next, the finishing process (S12) will be explained. As shown in FIG. 10, cutting is performed along the planned groove shape 10 by a finishing tool 40, which is formed in an upside-down Christmas tree shape, for the work material 1 in which the preliminary finished groove 3 has been formed in the semi-finishing process (S11), so that the specified cutting allowance 50 is cut off at one time. In this manner, the cutting processes of the tree-shaped groove 5 end.

As described above, in the cutting processes of the tree-shaped groove 5 according to the present embodiment, in the rough cutting process (S10), by using the rough cutting tool 20, as well as cutting the tapered groove 2, cutting is performed in the first narrow portion 11, the second narrow portion 12, and the third narrow portion 13 of the planned groove shape 10 such that the specified allowance 50 is left. Accordingly, in the following semi-finishing process (S11), by using the semi-finishing tool 30, the portions other than the first narrow portion 11, the second narrow portion 12, and the third narrow portion 13, which have already been cut, may be cut. In order words, the already cut first narrow portion 11, second narrow portion 12, and third narrow portion 13 do not come in contact with the reduced diameter portions of the first reduced diameter portion 41, the second reduced diameter portion 42, and the third reduced diameter portion 43 of the semi-finishing tool 30 formed in an upside-down Christmas tree shape, so that concentration of stress on the first reduced diameter portion 41, the second reduced diameter portion 42, and the third reduced diameter portion 43, which are relatively weak against shock among all the portions of the semi-finishing tool 30, is reduced and a load is not imposed on the reduced diameter portions. As a result, burrs can be reduced to a minimum, breakage resistance can be improved, and stable machining can be performed. In addition, it is possible to extend the tool life of the semi-finishing tool 30. Further, it is also possible to suppress chatter noise and vibration that arise during machining.

Further, because cutting is performed by the first expanded diameter portion 45, the second expanded diameter portion 46, and the protruding portion 48, which are relatively strong against shock, the cutting feed by the semi-finishing tool 30 can be faster. Therefore, the work of the semi-finishing process can be efficiently performed and thus the cutting of the tree-shaped groove 5 can be efficiently performed. Further, the cutting of the first narrow portion 11, the second narrow portion 12, and the third narrow portion 13, which is performed in the semi-finishing process (refer to FIG. 12) in the known art, is performed in the rough cutting process (S10), and the cutting of the T-slot portion 18, which is performed in the T-slot process (refer to FIG. 12) in the known art, is performed in the semi-finishing process (S11), so that it is possible to reduce the number of processes from four in the known art to three. As a result, the cutting of the tree-shaped groove 5 can be efficiently performed.

Next, in order to evaluate the cutting processes of the tree-shaped groove 5 according to the present embodiment, a comparison was made in the semi-finishing process between a novel method in which the semi-finishing tool 30 (the product of the present invention) was used and a known method in which a semi-finishing tool 112 (a known product) was used. In the comparison test, a cutting feed in a case where the semi-finishing tool 30 was used in the semi-finishing process in the novel method and a cutting feed in a case where the semi-finishing tool 112 was used in the semi-finishing process in the known method were respectively measured. The conditions for each of the tools (the diameter, the number of cutting edges) and the cutting conditions (the cutting speed, the feed per cutting edge, the revolution speed) are shown in Table 1 below.

TABLE 1

| Unit | Diameter mm | Number of Cutting Edges Number | Cutting Speed mm/min | Feed per Cutting Edge mm/edge | Revolution Speed min$^{-1}$ | Cutting Feed mm/min |
|---|---|---|---|---|---|---|
| Product of Present Invention | 20.5 | 4 | 20 | 0.03 | 310.6 | 37.3 |
| Known Product | 20.5 | 4 | 20 | 0.02 | 310.6 | 24.8 |

Specifically, the settings for the product of the present invention were that the diameter is 20.5 millimeters, the number of cutting edges is four edges, the cutting speed is 20 millimeters per minute, the feed per cutting edge is 0.03 millimeters per edge, and the revolution speed is 310.6 min$^{-1}$. On the other hand, the settings for the known product were that the diameter is 20.5 millimeters, the number of cutting edges is four edges, the cutting speed is 20 millimeters per minute, the feed per cutting edge is 0.02 millimeters per edge, and the revolution speed is 310.6 min$^{-1}$.

Figure 11:
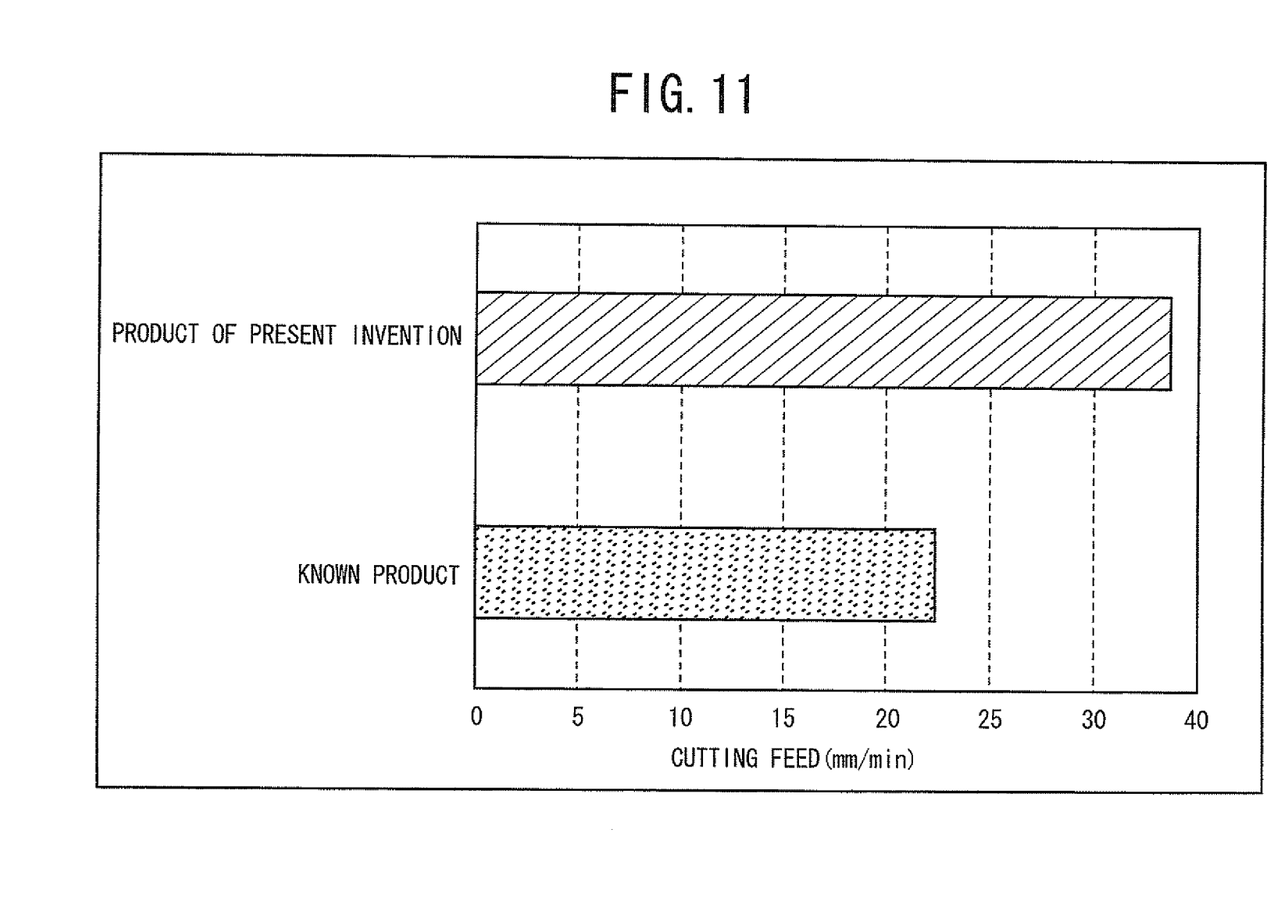
FIG. 11 is a graph that shows results of an evaluation test.

As shown in FIG. 11 and Table 1, while the cutting feed (min/min) in the case where the known product is used is 24.8 millimeters per minute, the cutting feed (mm/min) in the case where the product of the present invention is used is 37.3 millimeters per minute. In the method in which the known product is used, in the semi-finishing process, the tree-shaped groove must be cut by the semi-finishing tool 112 such that a specified cutting allowance is left for all the portions of the final planned groove shape. Because reduced diameter portions of the semi-finishing tool 112 have a reduced diameter, a load may be imposed on the reduced diameter portions during cutting. Accordingly, in order to prevent a load from being imposed on the reduced diameter portions, the cutting feed could not be increased.

On the other hand, in the method in which the product of the present invention is used, in the rough cutting process, the first narrow portion 11, the second narrow portion 12, and the third narrow portion 13 of the planned groove shape 10 have already been cut such that the specified cutting allowance 50 is left. Therefore, the already cut first narrow portion 11, second narrow portion 12, and third narrow portion 13 do not come in contact with the reduced diameter portions of the first reduced diameter portion 41, the second reduced diameter portion 42, and the third reduced diameter portion 43 of the semi-finishing tool 30, which is the product of the preset invention, therefore, a load is not imposed on the first reduced diameter portion 41, the second reduced diameter portion 42, and the third reduced diameter portion 43, which are relatively weak against shock among all the portions of the semi-finishing tool 30. Accordingly, it is presumed that the cutting feed by the semi-finishing tool 30 could be faster because cutting is performed only by the first expanded diameter portion 45, the second expanded diameter portion 46, and the protruding portion 48, which are relatively strong against shock.

In the above-described embodiment, the rough cutting tool 20, the semi-finishing tool 30, and the finishing tool 40, which are "rotary cutting tools" of the present disclosure, may be end mills or side cutters, for example.

It is obvious that various types of modifications may be made to the present disclosure. For example, in the above-described embodiment, in the rough cutting process, all the narrow portions of the first narrow portion 11, the second narrow portion 12, and the third narrow portion 13 are cut in advance such that the specified cutting allowance 50 is left, however, at least two narrow portions located on the groove bottom side, where the groove width is significantly narrow, may be cut. Thus, it is possible to prevent a load from being imposed on at least two reduced diameter portions located on the tip end side of the semi-finishing tool 30, where the diameter is significantly small.

INDUSTRIAL APPLICABILITY

The method of cutting a tree-shaped groove and the rotary cutting tools of the present disclosure is not limited to the tree-shaped groove and may be applied to a case in which cutting is performed for the shape of a groove that is provided in a plurality by undercutting.

The invention claimed is:

1. A method of cutting a tree-shaped groove for mounting a turbine blade on an outer circumference of a rotor, the tree-shaped groove being an upside-down Christmas tree shape machined such that the tree-shaped groove is bilaterally symmetrical with respect to a center of the groove and the tree-shaped groove gradually becomes narrower in a groove depth direction, the tree-shaped groove including, in order toward the groove depth direction, a first narrow portion having a first narrow groove width, a second narrow portion having a second narrow groove width that is narrower than the first narrow portion, a third narrow portion having a third narrow groove width that is narrower than the second narrow portion, a first wide portion that is between the first narrow portion and the second narrow portion and that has a first wide groove width, and a second wide portion that is between the second narrow portion and the third narrow portion and that has a second wide groove width that is narrower than the first wide portion, the cutting being performed by a first tool and a second tool, the first tool including as a cutting edge portion a column portion and a cone portion, which is provided on a tip end of the column portion and that has a tapered shape in which the diameter decreases toward a tip end of the cone portion, the cutting edge portion being provided on a tip end of a tool body that can be rotated around an axis, and the second tool being a tool whose diameter gradually changes toward a tool tip end such that the diameter increases and decreases corresponding to a change in the groove width of the tree-shaped groove, that includes, in order from a tool back end toward the tool tip end, a first reduced diameter portion, a first expanded diameter portion, a second reduced diameter portion, a second expanded diameter portion, and a third reduced diameter portion, and that is provided with nicks on the first reduced diameter portion, the first expanded diameter portion, and the second expanded diameter portion to reduce contact friction with a work material and to improve chip removal, and that is not provided with a nick on either the second reduced diameter portion or the third reduced diameter portion, the method comprising:

a rough cutting step of cutting by the first tool of a tapered shape in which the groove width becomes narrower toward the groove depth direction, while first, second, and third specified cutting allowances are left for portions that will become the first, second, and third narrow portions;

a semi-finishing step of performing cutting by the second tool such that fourth and fifth specified cutting allowances are left for portions that will become the first and second wide portions while avoiding the portions that will become the first, second, and third narrow portions; and     a finishing step of cutting the first, second, third, fourth and fifth cutting allowances,     the rough cutting step further comprising:

a first machining in which cutting is performed by the column portion of the first tool in parallel with the groove depth direction up to a portion that will become the first narrow portion while the first specified cutting allowance is left, and         a second machining in which, while the second and third specified cutting allowances are left, cutting is performed by the cone portion of the first tool into a tapered shape connecting the portion that will become the second narrow portion and the portion that will become the third narrow portion, from a portion that will become the first wide portion to a portion that will become a bottom portion of the tree-shaped groove, and     the semi-finishing step further comprising:

cutting the portion that will become the first wide portion by the first expanded diameter portion and cutting the portion that will become the second wide portion by the second expanded diameter portion such that the fourth and fifth specified cutting allowances are left while the first reduced diameter portion avoids the portion that will become the first narrow portion, the second reduced diameter portion avoids the portion that will become the second narrow portion, and the third reduced diameter portion avoids the portion that will become the third narrow portion.

2. The method of cutting the tree-shaped groove according to claim 1, wherein:

the tree-shaped groove is a groove having a flange-shaped T-slot portion in the bottom portion,     a portion that will become the T-slot portion is cut in the semi-finishing step while leaving a sixth specified cutting allowance, and     the sixth specified cutting allowance is cut in the finishing step.

3. A rotary cutting tool that is to be used in a semi-finishing step of a method of cutting a tree-shaped groove for mounting a turbine blade on an outer circumference of a rotor, the rotary cutting tool comprising:

a diameter that gradually changes toward a tool tip end such that the diameter increases and decreases corresponding to a change in a groove width of the tree-shaped groove,     a first reduced diameter portion;

a second reduced diameter portion;

a third reduced diameter portion;

a first expanded diameter portion;

a second expanded diameter portion; and nicks are provided on the first reduced diameter portion, the first expanded diameter portion, and the second expanded diameter portion to reduce contact friction with the work material and to improve chip removal, and a nick is not provided on either the second reduced diameter portion or the third reduced diameter portion.

\* \* \* \* \*